United States Patent [19]

Mattucci et al.

[11] Patent Number: 5,359,801
[45] Date of Patent: Nov. 1, 1994

[54] SCENT DISPENSER

[76] Inventors: Raymond S. Mattucci, 126 Gertrude St., Jeannette, Pa. 15644; Denis G. Hays, 26 N. Urania Ave., Greensburg, Pa. 15601; Chris A. Oplinger, 240 Ashbaugh Rd., Jeannette, Pa. 15644

[21] Appl. No.: 97,385

[22] Filed: Jul. 26, 1993

[51] Int. Cl.⁵ .............................................. F41C 27/00
[52] U.S. Cl. ........................................... 43/1; 239/139
[58] Field of Search .................. 43/1, 129; 239/135, 239/136, 34

[56] References Cited

U.S. PATENT DOCUMENTS

| | | | |
|---|---|---|---|
| 627,214 | 6/1899 | Steele | 239/136 |
| 914,863 | 3/1909 | McKendrick | 239/34 |
| 1,144,508 | 6/1915 | Taylor | 239/136 |
| 2,330,034 | 9/1943 | Doodchenko | 239/136 |
| 3,119,965 | 1/1964 | Bilyeu | 21/117 |
| 4,679,943 | 7/1987 | Kavoussi et al. | 368/12 |
| 4,771,563 | 9/1988 | Easley | 43/1 |
| 4,895,511 | 1/1990 | Schmid | 431/126 |
| 4,937,431 | 6/1990 | Jameson et al. | 219/274 |
| 5,060,411 | 10/1991 | Uhlman | 43/1 |
| 5,094,025 | 3/1992 | Daniels | 43/1 |

FOREIGN PATENT DOCUMENTS 0483710 4/1938 United Kingdom ............... 239/136

OTHER PUBLICATIONS

Outdoor Life, "Scent Propelling", Gerald Bethge, Dec. 1992, p. 20.
Bass Pro Shops® 1992, Hunting Catalog, Item U67-8-180, "Tink's #60 Scent Dispenser", p. 101

*Primary Examiner*—P. Austin Bradley
*Assistant Examiner*—James Miner
*Attorney, Agent, or Firm*—Webb Ziesenheim; Bruening Logsdon

[57] ABSTRACT

A scent dispenser includes an upper reservoir which holds a liquid scent source and a lower chamber which houses an adjustable burner. The burner emits heat to the upper reservoir and exhausts through a central vent pipe, causing the scent held in the upper chamber to volatilize. Exhaust from the vent pipe entrains volatilized scent and carries it into the atmosphere. A method for dispensing scent is also disclosed.

20 Claims, 2 Drawing Sheets

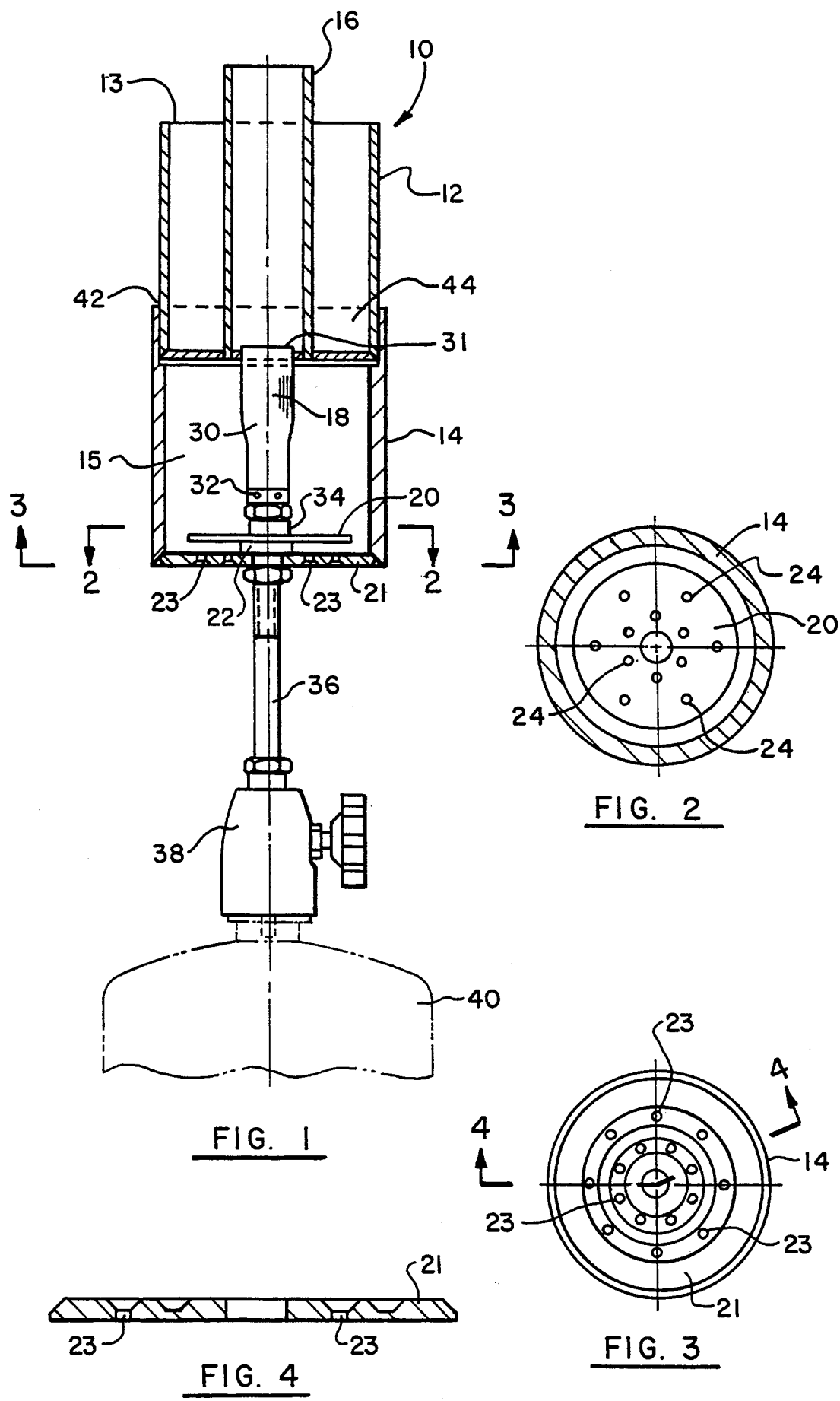

SCENT DISPENSER

BACKGROUND OF THE INVENTION

1. Field of the Invention

This invention relates to attraction by scent and, more particularly, to a device for dispensing scent in an outdoor area to attract a particular animal.

2. Description of the Prior Art

It has been known for some time that animal scents, such as the urine of a female deer or "doe," can be used in hunting to either mask human odor or to attract the animal. Various methods and devices for dispensing animal scent into the surrounding area have been disclosed. Mechanical propelling means are utilized in the Salter Scent Propeller, advertised in Outdoor Life, December 1992, at page 20. U.S. Pat. No. 5,060,411 to Uhlman further discloses a fluid dispensing container with a nozzle to dispense game attracting fluid to a surrounding area.

It is also known that when the weather is cold, scents do not carry well. Therefore, various attempts have been made to keep the scent source warm. This serves two purposes: first, it prevents the scent source from freezing, and second, the warm source volatilizes more rapidly and carries further into the atmosphere. Several references teach the use of a heating element powered by an electrochemical cell. Typically, these references incorporate or allow for some form of wick, such as a felt pad or cotton balls, to draw the scent source from a holding container to the heat where it can be vaporized and dispersed into the atmosphere. Examples of such devices are disclosed in U.S. Pat. No. 4,937,431 to Jameson et al., U.S. Pat. No. 4,771,503 to Easley, U.S. Pat. No. 5,094,025 to Daniels, and Tink's Scent Dispenser advertised in the Bass Pro Shops ®1992 Hunting Catalog at page 101.

Although electrical heating does prevent the scent source from freezing in cold weather, several batteries must often be used to heat the scent source sufficiently to allow for effective dispersal to the surrounding area. The batteries must then be recharged or disposed of in an environmentally sound manner. Additionally, since all of the scent source drawn to the wick will not be volatilized and much of it cannot be recovered for use at a later time, the wick is often wasteful of scent source.

A catalytic type burner, such as utilized by a conventional hand warmer, has also been disclosed in U.S. Pat. No. 3,119,650, to Bilyeu. The device in Bilyeu employs a porous material containing a lure composition. Heat from the burner permeates through a burner cover and into the porous material causing the lure composition to be heated and driven off into the atmosphere. However, the operator must rely on air convection to carry the scent. Thus, the device is not practical for long range scent dispensing, as is necessary for the device to effectively attract game.

For the foregoing reasons, there is a need for a scent dispensing device which effectively heats and dispenses scent source over a sufficiently large area for hunting, without wasting the scent source.

SUMMARY OF THE INVENTION

The present invention is directed to a scent dispenser for dispensing animal scent into a surrounding area preferably used for the attraction of game. The scent dispenser of the present invention includes a) a reservoir for holding a liquid scent source exposed to the atmosphere and b) a housing for a burner which heats the scent source in the reservoir causing the scent source to volatilize. The housing is provided with at least one opening to allow for admission of air into a chamber defined by the housing. A vent communicates with the chamber and extends through the reservoir.

The preferred embodiment of the present invention includes an upper reservoir with a top rim. The reservoir receives a liquid scent source and exposes the source to the atmosphere. A lower housing removably engages the upper reservoir in nesting fashion. The lower housing has a bottom surface containing a plurality of apertures for admission of air into the chamber. A burner, housed in the chamber, includes a barrel and a burner orifice.

A central vent pipe extends from the chamber to above the top rim of the upper reservoir. The vent pipe is arranged coaxially with the burner and receives the burner orifice. An air baffle is arranged coaxially with the burner and has a plurality of apertures which are offset from the apertures in the lower housing. Additionally, means for supplying a fuel to the burner are provided.

The present invention is also directed to a method of dispensing scent into the atmosphere for attracting game which comprises a) placing the scent dispenser in a suitable location; b) charging a scent source into the upper reservoir of the scent dispenser; c) introducing a flame from the burner into the vent to generate and release heat into the upper reservoir; and d) entraining volatilized scent in the flame exhaust to carry the scent into the atmosphere.

BRIEF DESCRIPTION OF THE DRAWINGS

These and other features, aspects and advantages of the present invention will become better understood with regard to the following description, appended claims and accompanying drawings where:

FIG. 1 is a side view of the scent dispenser connected to a fuel tank with a cut-out of the lower chamber to show the interior;

FIG. 2 is a plan view of the air baffle;

FIG. 3 is a plan view of the bottom surface of the lower housing;

FIG. 4 is a cross-sectional view of the bottom surface of the lower housing.

DETAILED DESCRIPTION OF THE PREFERRED EMBODIMENT

Figure 5:
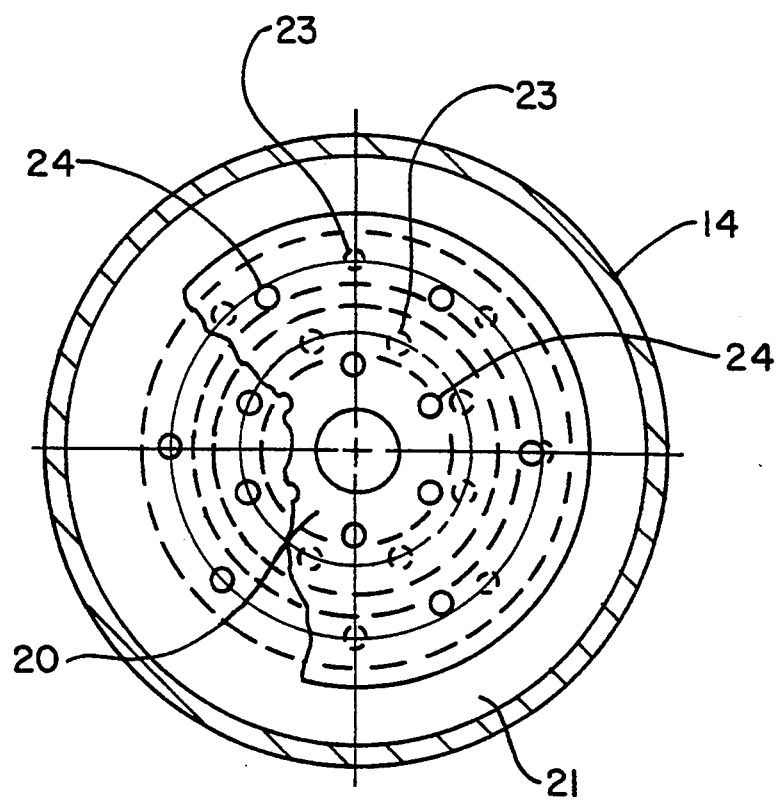
FIG. 5 is a plan view, partially broken away, showing the apertures of the air baffle offset from the apertures of the bottom surface of the lower housing.

Referring to FIG. 1, a scent dispenser 10 for attraction of animals with scent is shown. The scent dispenser has an upper reservoir 12 having a top rim 13, preferably made from aluminum pipe, which is stacked in removable, nesting fashion above a lower housing 14. The housing defines a chamber 15. A central vent pipe 16 is secured within the upper reservoir 12 and extends vertically through and above the upper reservoir. Below the central vent pipe 16 and extending slightly into the central vent pipe 16 is a burner 18 with an air baffle 20 arranged coaxially with the burner 18. Between a bottom surface 21 of the lower housing 14 and air baffle 20 is a spacer 22.

Preferably, the bottom surface 21 includes a plurality of apertures 23. Referring to FIGS. 2 and 5, the air baffle 20 further contains a series of apertures 24, equally spaced in concentric circles from the center of the air baffle. Apertures 24 are offset from apertures 23 in bottom surface 21 of the lower housing 14. The burner 18 includes a barrel 30, orifice 31, air inlet 32, moveable collar 34 and fuel tube 36. The fuel tube extends through the bottom surface 21 of the lower housing 14 and connects to a control valve 38, which serves to regulate flow from a combustible fuel source 40.

The scent dispenser of the present invention was designed with safety as a primary concern. The upper reservoir 12 and lower housing 14 are held securely together by a slip joint 42, in which the upper reservoir 12 is overlapped by a portion of the lower housing 14. The slip joint 42 holds the scent dispenser 10 together and prevents the upper reservoir 12 and lower housing 14 from separating in the event the scent dispenser 10 is knocked over. Thus, an open flame will not be generated from the scent dispenser even if the scent dispenser 10 is knocked over.

The slip joint 42 also allows for easy assembly. The upper reservoir 12 can be stacked in nesting fashion securely above the lower housing 14 by engaging slip joint 42. Conversely, the scent dispenser 10 can be easily disassembled by loosening the slip joint 42 to remove the upper reservoir 12.

Preferably, the upper reservoir 12 is made from aluminum. Additionally, to minimize light reflection, all exterior surfaces of the scent dispenser 10 are dulled, such as by sandblasting. The preferred embodiment utilizes an upper reservoir which will hold about 6 ounces of scent source.

The scent dispenser, as shown in FIG. 1, can be assembled in the field by connecting the combustible fuel source to the burner 18. Propane is the fuel of choice. The unit is then put together firmly at slip joint 42. The operator then stands the unit in the center of an area cleared of all twigs, leaves and debris. Preferably the cleared area is at least 3 feet in diameter. A large flat rock is ideal. A scent source 44 is then poured into the upper reservoir 12. While holding a lit match or lighter just above the center of the vent pipe, the control valve 38 is slowly opened until the unit ignites. Adjustments can then be made as needed. Scent will then be heated and begin to be dispersed.

The generated flame is received by the central vent pipe 16, which creates a vortex to effectively carry the scent. It is important to note that only a slight flow of fuel is needed to cause ignition. Dispersion of the scent will continue for the next 6 to 8 hours before total evaporation of the scent source 44 occurs.

A preferred and cost-effective use of the present invention utilizes a 50/50 water to scent source mixture. This mixture puts out a strong scent and creates considerable savings for the user. Additionally, the mixture raises the heat tolerance of the scent enabling higher heat to be used to produce a strong scent without damaging the quality of the scent.

The flame temperature needed to effectively vaporize the scent source depends on the outside temperature. For example, on days with 70° F. temperature, a 130° F. flame temperature has been found to be effective. Lower atmospheric temperatures require a higher flame temperature for effective dispersal of scent. However, the scent mixture will begin to foam up around 170° F. Therefore, the scent dispenser 10 does not operate effectively at such a high temperature.

The scent dispenser of the present invention is advantageous over the prior art as the present invention not only heats the scent source 44 but dispenses it more effectively. The flame rising through the central vent pipe 16 creates a vortex which has proven effective in dispensing the scent at least 500 yards from the scent dispenser 10. Particularly, it is believed that exhaust from the vent pipe entrains volatilized scent and carries it away from the scent dispenser.

The scent dispenser of the present invention is further designed to withstand winds up to 20 miles per hour, with gusts up to 40 miles per hour. The configuration of the apertures 23, 24 and air baffle 20 facilitates this wind resistance. The scent dispenser of the present invention has also been used to disperse strong steady scent flow under drizzle, rain and fog conditions. Additionally, the scent dispenser 10 weighs only 1 and ½ pounds (without the fuel tank) providing for easy transport to and from the field. No batteries must be bought, recharged or disposed of in an environmentally safe manner. Further operational advantages stemming from the invention are as follows:

(1) The central vent pipe creates a warm spot in the center of the upper reservoir; scent source in this area rises while that along the outer, cooler walls of the reservoir falls, thus promoting convection in the scent source.

(2) Convection in the liquid scent source results in automatic stirring of the source, which facilitates vapor release at lower temperatures, for example 130° F.

(3) The air baffle and aperture arrangement of the invention enables maintenance of a desired temperature in the upper reservoir within ±20° F. It is believed the apertures and the baffle in the chamber 15 impart a controlled chimney effect, enabling temperature uniformity.

(4) The invention includes an adjustable heat source, heretofore unavailable with prior art battery-operated and handwarmer-type scent dispensers.

(5) The invention enables the user to preheat the scent source, and then turn down the burner flame for prolonged use. This reduces set-up time.

(6) The invention may also be used to heat water for beverages or cooking by using interchangeable reservoirs.

Although the present invention has been described in considerable detail with reference to certain preferred versions thereof, other versions are possible. Therefore, the spirit and scope of the appended claims should not be limited to the description of the preferred versions contained herein.

What is claimed is:

1. A heating device, comprising:
   a) a reservoir for holding a liquid and exposing the liquid to the atmosphere;
   b) a burner which heats the liquid in said reservoir;
   c) a burner housing having a chamber which receives said burner, said chamber having at least one opening for admission of air into said chamber; and
   d) means for receiving exhaust from said burner, said means comprising a vent in communication with said chamber and extending through said reservoir.

2. The device of claim 1 including adjustable fuel supply means for said burner.

3. The device of claim 1 further comprising an air baffle positioned in said chamber and coaxially arranged with said burner.

4. The device of claim 3 wherein said air baffle includes a plurality of apertures.

5. The device of claim 4 wherein the apertures in said air baffle are radially or circumferentially offset from said at least one opening in the bottom surface of the burner housing.

6. The device of claim 1 including a slip joint for removable nesting engagement of said reservoir on said burner housing.

7. The device of claim 1 wherein said at least one opening for admission of air into said chamber includes a plurality of apertures in a bottom surface of the burner housing.

8. The device of claim 1 wherein said vent comprises a central vent pipe in communication with said chamber and extending through said reservoir.

9. The device of claim 1 wherein said vent is coaxial with and receives a portion of said burner.

10. A heating device, comprising:
 a) a reservoir for holding a liquid and exposing it to the atmosphere;
 b) a burner which heats the liquid in said reservoir;
 c) a burner housing having a chamber which receives said burner, said chamber having at least one opening for admission of air into said chamber;
 d) means for receiving exhaust from said burner, said means comprising a vent in communication with said chamber and extending through said reservoir; and
 e) an air baffle positioned in said chamber and coaxially arranged with said burner.

11. The device of claim 10 wherein said vent is coaxial with and receives a top portion of said burner.

12. The device of claim 10 wherein said air baffle includes a plurality of apertures therein.

13. The device of claim 12 wherein the apertures in said air baffle are radially or circumferentially offset from said at least one opening in the bottom surface of the burner housing.

14. A device for dispensing scent into the atmosphere, comprising:
 a) an upper reservoir having a top rim, said reservoir receiving a liquid scent source and exposing the source to the atmosphere;
 b) a lower housing engaged with said upper reservoir in nesting fashion, said lower housing having a chamber and a bottom surface, said bottom surface having a plurality of apertures for admission of air into said chamber;
 c) a burner, having a barrel and a burner orifice, said burner housed in said chamber;
 d) a central vent pipe extending from said lower chamber to a position above the top rim of said upper reservoir, said vent pipe coaxial with said burner and receiving said burner orifice;
 e) an air baffle coaxially arranged with said burner, said air baffle having a plurality of apertures offset from the apertures in said lower housing; and
 f) means for supplying a fuel to said burner.

15. The device of claim 14 including a spacer between the bottom surface of said housing and said air baffle.

16. The device of claim 14 including a slip joint between said upper reservoir and lower housing.

17. The device of claim 14 including a valve in line with said fuel supply means for regulation of fuel flow to said burner.

18. The device of claim 14 wherein said upper reservoir is made from dulled aluminum.

19. A method of dispensing scent into the atmosphere for attracting game, comprising the following steps:
 a) placing a scent dispensing device in a suitable location, said scent dispensing device including an upper reservoir for holding a liquid scent source and exposing it to the atmosphere, a central vent pipe, a lower housing attached to said upper reservoir, and an adjustable burner disposed in said housing;
 b) charging a scent source into said upper reservoir;
 c) introducing a flame from said burner into said vent pipe to generate and release heat into said upper reservoir; and
 d) entraining volatilized scent in exhaust from said flame and carrying said scent into the atmosphere.

20. The method of claim 19 wherein a 50/50 mixture of water and a pure scent source is utilized in step b).

* * * * *